United States Patent
Tazzari et al.

(10) Patent No.: US 10,534,391 B2
(45) Date of Patent: Jan. 14, 2020

(54) METHOD FOR AUTOMATICALLY ASSOCIATING A MODULE TO A CORRESPONDING INVERTER, AND RELATED MODULE AND POWER GENERATION SYSTEM

(71) Applicant: ABB Schweiz AG, Baden (CH)

(72) Inventors: Davide Tazzari, Loro Ciuffenna (IT); Filippo Vernia, La Spezia (IT)

(73) Assignee: ABB Schweiz AG, Baden (CH)

( * ) Notice: Subject to any disclaimer, the term of this patent is extended or adjusted under 35 U.S.C. 154(b) by 618 days.

(21) Appl. No.: 15/225,590

(22) Filed: Aug. 1, 2016

(65) Prior Publication Data
US 2017/0031378 A1 Feb. 2, 2017

(30) Foreign Application Priority Data
Jul. 31, 2015 (EP) .................................... 15179228

(51) Int. Cl.
| | | |
|---|---|---|
| *G05F 1/66* | (2006.01) | |
| *H02M 7/44* | (2006.01) | |
| *G05B 19/406* | (2006.01) | |
| *H02J 3/38* | (2006.01) | |

(52) U.S. Cl.
CPC ............ *G05F 1/66* (2013.01); *G05B 19/406* (2013.01); *H02M 7/44* (2013.01); *G05B 2219/41293* (2013.01); *H02J 3/383* (2013.01); *H02J 3/386* (2013.01)

(58) Field of Classification Search
CPC .............. G05B 19/0423; G05B 19/406; G05B 2219/37348; G05B 2219/41293; G05F 1/66; H02J 3/383; H02J 3/386; H02M 7/44; H02S 50/00; Y02B 70/3241; Y04S 20/227
See application file for complete search history.

(56) References Cited

U.S. PATENT DOCUMENTS

| | | | |
|---|---|---|---|
| 2008/0312756 A1 | 12/2008 | Grichnik et al. | |
| 2012/0068687 A1* | 3/2012 | Magnussen | H02S 50/10 324/71.1 |
| 2012/0163279 A1* | 6/2012 | Tran | H04Q 9/00 370/312 |
| 2013/0250635 A1 | 9/2013 | Sivakumar et al. | |
| 2015/0073736 A1* | 3/2015 | Ebner | G01R 21/133 702/61 |

OTHER PUBLICATIONS

European Patent Office, Extended Search Report issued in corresponding Application No. 15179228.0, dated Feb. 8, 2016, 9 pp.

* cited by examiner

*Primary Examiner* — Kenneth M Lo
*Assistant Examiner* — Mohammad A Rahman
(74) *Attorney, Agent, or Firm* — Taft Stettinius & Hollister LLP; J. Bruce Schelkopf

(57) ABSTRACT

A method for automatically associating a module to a corresponding inverter of a plurality of inverters which are adapted to generate measurements related to their operation, comprising: installing the module for generating measurements related to the operation of a corresponding inverter of the plurality of inverters; comparing, by processing means, the measurements generated by the module to the measurements generated by the plurality of inverters; and basing on the comparison, determining by the processing means which of the plurality of inverters is the corresponding inverter of the module.

18 Claims, 4 Drawing Sheets

METHOD FOR AUTOMATICALLY ASSOCIATING A MODULE TO A CORRESPONDING INVERTER, AND RELATED MODULE AND POWER GENERATION SYSTEM

The present invention relates to how automatically associating a module, e.g. a meter, to a corresponding inverter of a plurality of inverters installed in a power generation plant. As known, inverters are power electronic devices which can be used in power generation plants, especially in renewable power generation plants, such as solar or wind plants, for performing power conversion of DC power received by one or more sources into AC power.

The inverters can have their own means for providing measurements related to their operation, such as means for measuring their electrical outputs, e.g. the generated AC current, voltage, power, and/or energy.

These measurements can be used by a control system of the power generation plant, for performing monitoring and/or controlling and/or diagnostic tasks on the inverters themselves or other elements, devices or components of the plant.

Generally, a master/slave communication is used, implemented by a serial line, where the control system is the master and the inverters are slave devices which are asked one-by-one by the master. Especially according to this master/slave approach, each slave must have an address different than the addresses of the other slaves.

Modules, such as meters, can be installed in the plant, each one for providing measurements related to the operation of a corresponding one of the inverters.

In particular, the measurements of the modules, generally having an accuracy higher than the measurements of the corresponding inverters, can be used for integrating or replacing the measurements of the inverters at the control system.

The installer, when installing a new module, has to manually take note of the association between such new module and the corresponding inverter and provide this information to the control system, so as to integrate or replace the measurements from the corresponding associated inverter with the measurements from the new module.

Further, in addition of taking note of the module-inverter association, the installer has to manually assign an unused address to the new module, especially in view of the communication with the control system.

In light of above, at the current state of the art, although known solutions perform in a rather satisfying way, there is still reason and desire for further improvements.

Such desire is fulfilled by a method for automatically associating a module to a corresponding inverter of a plurality of inverters which are adapted to generate measurements related to their operation. The method comprises:

a) installing the module for generating measurements related to the operation of a corresponding inverter of the plurality of inverters;

b) comparing, by processing means, the measurements generated by the module to the measurements generated by the plurality of inverters;

c) basing on the comparison, determining by the processing means which of the plurality of inverters is the corresponding inverter of the module.

Another aspect of the present invention is to provide a module adapted to generate measurements related to the operation of a corresponding inverter of a plurality of inverters. The module comprises processing means configured for:

sniffing measurements related to operations of the plurality of inverters and generable by the inverters themselves;

comparing the measurements of the module with the sniffed measurements; and basing on the comparison, determining which of the plurality of inverters is the corresponding inverter.

Another aspect of the present inventions is a power generation system comprising at least:

a plurality of inverters which are adapted to generate measurements related to their operations;

at least one module adapted to generate measurements related to the operation of a corresponding inverter of the plurality of inverters.

The power generation system further comprises processing means configured for:

a) comparing the measurements generable by the module to the measurements generable by the plurality of inverters;

c) basing on the comparison, determining which of the plurality of inverters is the corresponding inverter of the module.

Further characteristics and advantages will become more apparent from the description of some preferred but not exclusive embodiments of the method, module and power generation system according to the present invention, illustrated only by way of non-limiting examples with the aid of the accompanying drawings, wherein:

FIG. 1 schematically illustrates a power generation system comprising inverters and at least one measuring module according to the present invention;

Figure 1:
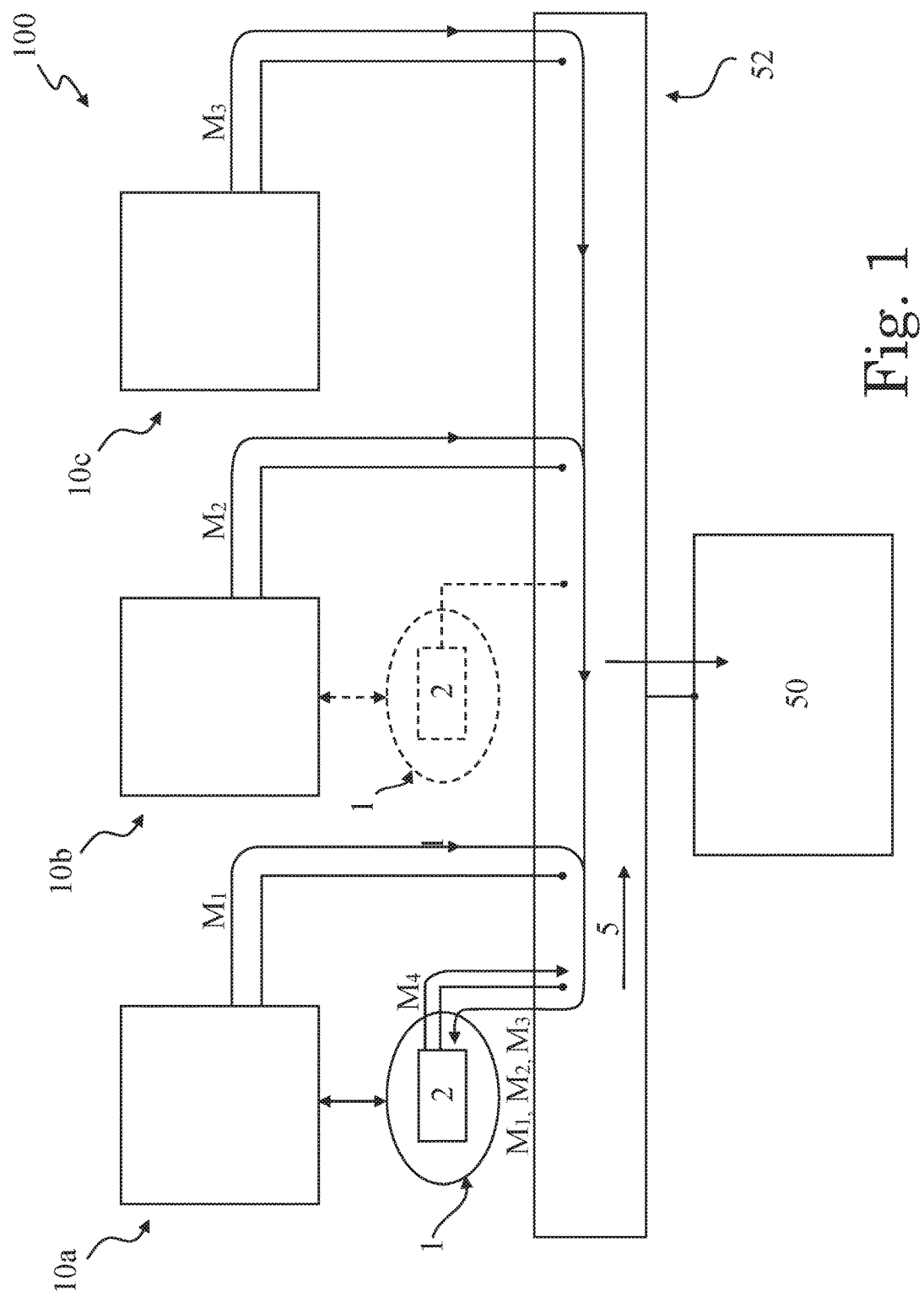

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "suitable", is used herein while referring to any component as a whole, or to any part of a component, or to a whole combinations of components, or even to any part of a combination of components, it has to be understood that it means and encompasses correspondingly either the structure, and/or configuration and/or form and/or positioning of the related component or part thereof, or combinations of components or part thereof, such term refers to.

Figure 2:
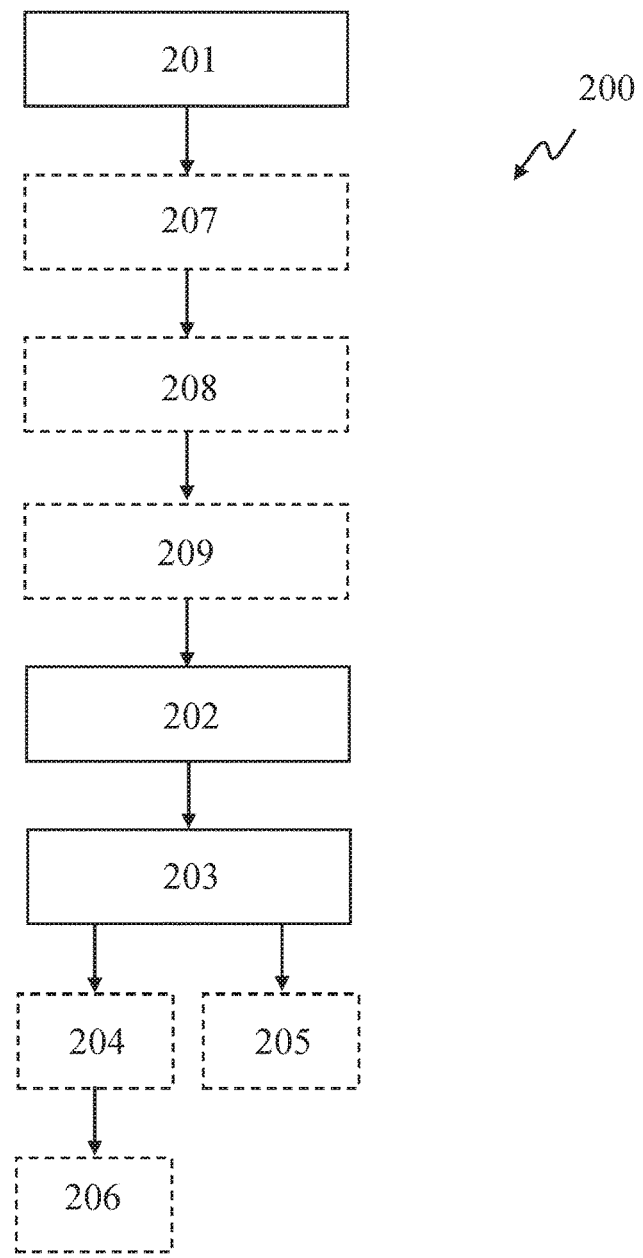
FIG. 2 illustrates, through diagram blocks, a method for automatically associating a measuring module to a corresponding inverter.

With reference to FIGS. 1 and 2 the present disclosure is related to a method 200 for automatically associating a module 1 to a corresponding inverter of a plurality inverters 10a, 10b, 10c . . . , which are installed in a power generation system 100, such a renewable energy generation system 100.

In the exemplary embodiment illustrated in FIG. 1 there are illustrated only three inverters 10a, 10b, 10c, even if the method 200 can be applied to a power generation system 100 having any number of inverters, i.e. two or more than three inverters.

During their operation, the inverters 10a, 10b, 10c receive in input power from DC sources, such as photovoltaic panels or wind towers, and convert the received DC power in output AC power; the outputted AC power can be delivered to one or more AC networks or loads.

Since the functioning and structure of an inverter for converting DC input power in AC output power is readily available to a person skilled in the art and it is not relevant for the scope and understanding of the present invention, it will not be described in particular details.

The inverters 10a, 10b, 10c are adapted to generate measurements related to their operation; such measurements are globally indicated in FIGS. 1, 3, 4 and in the following description by references $M_1$, $M_2$ and $M_3$, respectively.

With reference to FIG. 1, at least one module 1 can be installed in the power generation system 100, in such a way to generate measurements related to the operation of a corresponding one of the inverters 10a, 10b, 10c; this measurements are globally indicated in FIGS. 1, 3, 4 and in the following description with reference $M_4$.

In particular, the module 1 illustrated for example in FIG. 1 is installed for generating the measurements $M_4$ which are related to the operation of the inverter 10a. For example, the module 1 can be placed in or near the corresponding inverter 10a, in such a way to be operatively connected to electrical points and measure electrical parameters related to the operation of the inverter 10a.

Since the measurements $M_4$ of the module 1 and the measurements $M_1$, $M_2$, $M_3$ of the inverters 10a, 10b, 10c are all related to inverter operations, they are comparable to each other. For example, the measurements $M_1$, $M_2$, $M_3$ generable by the inverters 10a, 10b, 10c can comprise measurements related to the inverter electrical outputs, such as measurements of at least one of the generated AC current, voltage, power and energy, and the measurements $M_4$ generable by the module 1 accordingly comprise measurements related to the electrical outputs of the corresponding inverter. The module 1 can be for instance a meter 1 installed in the power generation system 100 for measuring at least one of outputted AC power, energy, current, voltage of the corresponding inverter 10a.

The measurements $M_1$, $M_2$, $M_3$ from the inverters 10a, 10b, 10c can comprise measurements related to different outputted electrical parameters of the inverters 10a, 10b, 10c themselves, and accordingly the measurements $M_4$ comprise measurements related to the same different outputted electrical parameters of the inverter 10a corresponding to the module 1. For example, the measurements $M_1$, $M_2$, $M_3$ can comprise measurements of the AC power and current outputted by the inverters 10a, 10b, 10c and the measurements $M_4$ accordingly comprise measurements of the AC power and current of the inverter 10a corresponding to the module 1. In this way, the AC powers and currents of measurements $M_1$, $M_2$, $M_3$ are comparable to the AC power and current of measurements $M_4$.

Preferably, the module 1 is configured for providing measurements having a higher accuracy than the measurements generated by the corresponding inverter 10a. For example, the module 1 can be a high quality meter 1 having the 0.2% or 0.5% accuracy class, or a higher quality class.

The module 1 comprises processing means 2. The term "processing means" refers to any means adapted to process data, measurements, digital and/or analog values or signals in order to execute devised operations.

Upon the installation of the module 1 for generating the measurements $M_4$ (method step 201), the method 200 comprises:

comparing the measurements $M_4$ generated by the module 1 to the measurements $M_1$, $M_2$, $M_3$ generated by the plurality of inverters 10a, 10b, 10c (method step 202); and basing on the comparison, determining which of the plurality of inverters 10a, 10b, 10c is the inverter corresponding to the module 1 (method step 203).

The above method steps 202, 203 are executed by processing means, realizing an automatically association between the module 1 and the corresponding inverter 10a.

Preferably, as illustrated for example in FIG. 1, the processing means for executing the steps 202, 203 are the processing means 2 of the module 1 itself.

According to a first solution, the candidate inverters 10a, 10b, 10c having their measurements $M_1$, $M_2$, $M_3$ compared with the measurements $M_4$ of the module 1 can be only the inverters of the power generation plant 100 which are determined to be module-free, i.e. without an associated module 1, before the execution of step 202.

Accordingly, in this case the method 200 comprises the step 209 of determining, by the processing means 2, which are the module-free inverters before executing following steps 202 and 203.

Since the measurements of the already module-associated inverters of the plant 100 are excluded from the comparison with the measurements $M_4$ of the module 1 at step 202, the execution of the method 200 is speeded up.

According a second alternative solution, the candidate inverters 10a, 10b, 10c having their measurements $M_1$, $M_2$, $M_3$ compared with the measurements $M_4$ of the module 1 are all the inverters of the power generation plant 100, hence comprising both module-free and already module-associated inverters.

The execution of steps 202 and 203 is carried out during the operations of the candidate inverters 10a, 10b, 10c.

In particular, after a period of time and basing on the measurement comparisons, only one of the candidate inverts 10a, 10b, 10c is determined to be the inverter corresponding to the module 1. This is due for instance to differences in the operational behavior of the inverters 10a, 10b, 10c, which can be caused by panel shading, different inverter size/model/control, different number of input DC sources, et cetera.

Preferably, method step 202 comprises the execution of at least one of the following operations:

calculating a difference between the measurements $M_4$ generated by the module 1 and the comparable measurements $M_1$, $M_2$, $M_3$ generated by the candidate inverters 10a, 10b, 10c;

correlating an electrical waveform represented by the measurements $M_4$ to electrical waveforms represented by the comparable measurements $M_1$, $M_2$, $M_3$, e.g. using mathematical algorithms; and statistically calculating an error, e.g. an average quadratic error and/or standard deviations, between the measurements $M_4$ and the comparable measurements $M_1$, $M_2$, $M_3$.

Preferably, the method step 203 comprises comparing the results of step 202 with at least one predetermined threshold 20. For example, if the results of the comparison between the measurements $M_4$ of the module 1 and the measurements $M_1$ or $M_2$ or $M_3$ of one candidate inverter 10a or 10b or 10c exceed a corresponding predetermined threshold 20, this candidate inverter is withdrawn in view of the association with the module 1.

In practice, after a limited time period, only the comparison results between the measurements $M_4$ of the module 1 and a single one of the candidate inverters 10a, 10b, 10c remain below the selecting threshold 20, while the other candidate inverters are withdrawn.

Preferably, as illustrated for example in FIG. 1, the inverters 10a, 10b, 10c are operatively associated to and adapted to transmit their measurements $M_1$, $M_2$, $M_3$ to a control system 50 of the power generation system 100.

The control system 50 is adapted to use the received measurements $M_1$, $M_2$, $M_3$ in order to perform its tasks, such as control and/or monitoring and/or diagnostic tasks on the inverters 10a, 10b, 10c, . . . and/or other devices or components installed in the system 100.

According to the exemplary embodiment schematically illustrated in FIG. 1, the modules 1 and the corresponding inverters 10a, 10b, 10c, . . . are operatively put in communication in parallel to the control system 50, preferably through a serial communication line 52, such as a RS485 line or other suitable serial communication channels.

Preferably, but not necessarily, a master-slave approach is used for data communication, where the control system 50 is the master asking in a polling way the measurements $M_1$, $M_2$, $M_3$ from the inverters 10a, 10b, 10c, which are slave devices.

According to the exemplary embodiment illustrated in FIG. 1, also the module 1 is operatively associated and adapted to transmit its measurements $M_4$ to the control system 50; preferably, the processing means 2 of the module 1 are adapted to transmit the measurements $M_4$.

For example, in the embodiment schematically illustrated in FIG. 1 the module 1 is operatively connected to the communication line 52, so as to be put in communication with the control system 50 and in parallel with the inverters 10a, 10b, 10c. Preferably, but not necessarily, also the module 1 is put in communication to the control system 50 according a master-slave approach, where the system 50 is the master device asking the measurements $M_4$ to the module 1, which is a slave device.

Preferably, the processing means 2 are further adapted to sniff the measurements $M_1$, $M_2$, $M_3$ generable by the candidate inverters 10a, 10b, 10c, in order to collect them in view of the comparison at method step 202. More preferably, the processing means 2 are adapted to sniff the measurements $M_1$, $M_2$, $M_3$ of the inverters 10a, 10b, 10c while flowing to the control system 50.

According to the exemplary embodiment illustrated in FIG. 1, the processing means 2 of the module 1 are operatively connected to the communication line 52, in such a way to sniff the measurements $M_1$, $M_2$, $M_3$ of the inverters 10a, 10b, 10c made available on the line 52, when asked by the control system 50.

Accordingly to the above description, the method 200 preferably comprises the steps 207 and 208 of:

transmitting the measurements $M_1$, $M_2$, $M_3$ of the inverters 10a, 10b, 10c to the control system 50; and sniffing, through the processing means 2, the measurements $M_1$, $M_2$, $M_3$ of the plurality of inverters 10a, 10b, 10c which are flowing to the control system 50.

According to the exemplary embodiment illustrated in FIG. 2, after execution of step 203, the method 200 further comprises a step 204 of providing, through the processing means 2, information (indicated with numeral reference 5 in the example illustrated in FIG. 1) about the association between the module 1 and the determined corresponding inverter 10a. The processing means 2 themselves can be adapted to generate such information 5.

Preferably, information 5 is provided to the control system 50, which is adapted to ask the module 1 which is its determined corresponding inverter 10a.

For example, the step 204 comprises tagging the measurements $M_4$ of the module 1 with the address of the determined corresponding inverter 10a; in this way, the control system 50 which receives the measurements $M_4$ can also acknowledge which is the determined corresponding inverter 10a of the module 1.

According to the exemplary embodiment illustrated in FIG. 2, after execution of step 203, the method 200 further comprises a step 205 of automatically assigning, preferably by the processing means 2, an unused address to the module 1; the term "unused" means not already used by the inverters 10a, 10b, 10c . . . or other modules 1 installed in the generation system 100.

For example, such step 205 comprises selecting an unused address having the same numerical base as the address of the determined inverter 10a associated to the module 1.

A set of unused addresses can be available in suitable means of the module 1 itself, such as its processing means 2, or it can be assigned and sent to the module 1 by the control system 50 after acknowledging information 5.

Preferably, the method step 209, if provided, comprises sniffing, by the processing means 2, data on the communication line 52 in order to determine which of the inverters are module-free before executing method step 202. For example, the processing means 2 are adapted to sniff the measurements of already installed modules 1, which are made available on the line 52, and to check how these sniffed measurments are tagged for indicating the association between the already installed modules 1 and the corresponding inverters.

Preferably, the method 200 further comprises a step 206 of swapping a use of the measurements $M_1$ generated by the inverter 10a to a use of the measurements $M_4$ generated by the associated module 1. This is particularly advantageous especially in view of the installation of a module 1 providing higher quality measurements than the corresponding inverter 10a.

In practice, the module 1 can be installed in the power generation plant 100 after the inverters 10a, 10b, 10c and, at the execution of method step 204, the control system 50 can acknowledge the association between the module 1 and the corresponding inverter 10a. As a consequence, the control system 50 can replace the measurements $M_1$ from the inverter 10a with the higher quality measurements $M_4$ of the module 1 in order to perform its tasks.

An exemplary execution of the method 200 is disclosed in the followings, by making particular reference to the power generation system 100 illustrated in FIG. 1.

A starting condition is considered, where three inverters 10a, 10b, 10c are installed in the system 100 in such a way to generate the measurements $M_1$, $M_2$, $M_3$ related to their operations and which are sent, through the communication line 52, to the control system 50.

Figure 3:
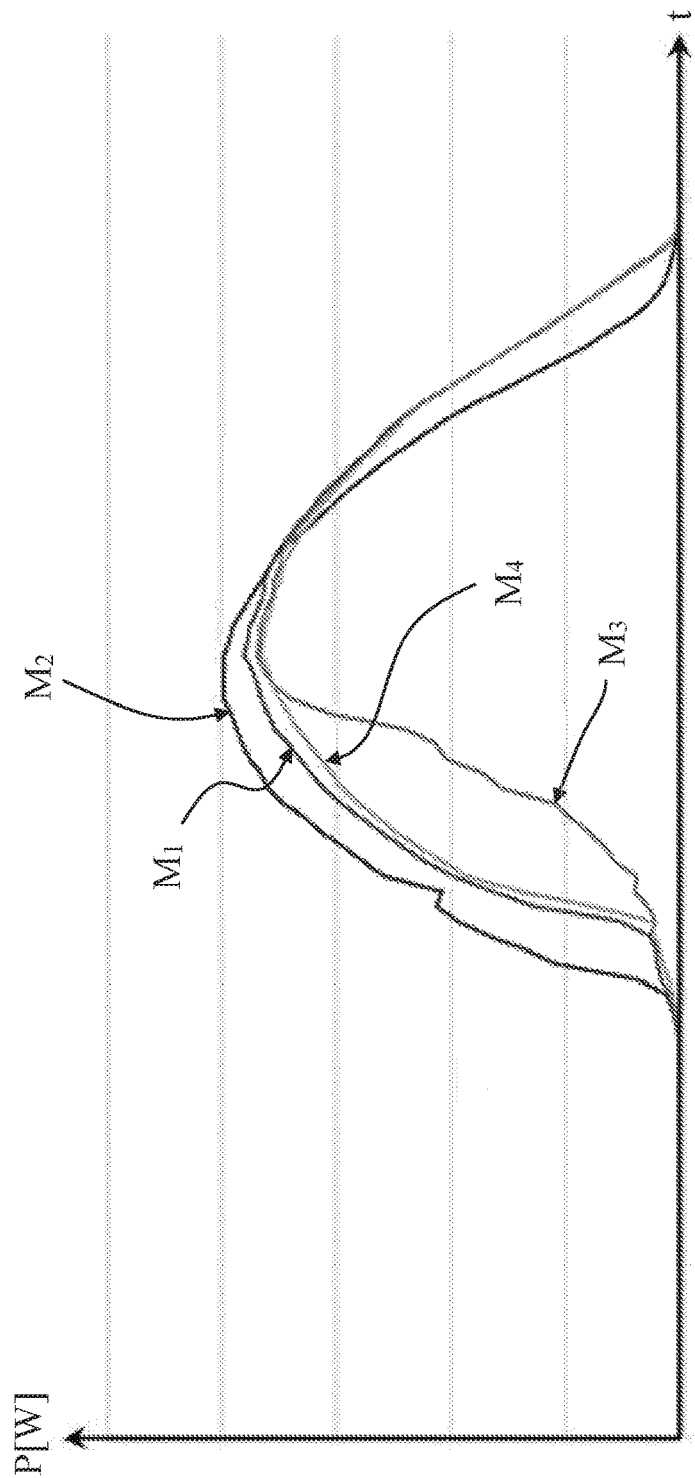
FIG. 3 illustrates a plot of power measurements over time, power measurements which are generated by three inverters and by a measuring module of a power generation system according to the present invention.

Examples of measurements $M_1$, $M_2$, $M_3$ generated over the time are illustrated in the plot of FIG. 3, where these measurements $M_1$, $M_2$, $M_3$ are measurements of the electrical AC power generated by the inverters 10a, 10b, 10c, respectively.

The control system 50 is adapted to ask, for example in a polling-way, the measurements $M_1$, $M_2$, $M_3$ which are made available on the communication line 52. These measurements $M_1$, $M_2$, $M_3$ are used by the control system 50 for performing it tasks, such as control and/or monitoring and/or diagnostic tasks.

In this starting condition, the illustrated inverters 10a, 10b, 10c are module-free, i.e. not yet associated to corresponding modules 1.

A further subsequent condition is considered, where one module 1 is installed in the power generation system 100 (method step 201) for generating its measurements $M_4$. With reference to FIG. 3, these measurements $M_4$ are for example measurements of the electrical power AC power generated by the corresponding inverter 10a (which is already providing its measurements $M_1$).

It is further considered for example the case where, even if the measurements $M_1$ and $M_4$ are related to the same outputted electrical entity of the inverter 10a, the measurements $M_4$ have a higher accuracy than measurements $M_1$.

Upon the installation of the module 1, its processing means 2 are operatively connected to the communication line 52. In particular, the processing means 2 are operatively connected to the communication line 52 in such a way to sniff the measurements $M_1$, $M_2$, $M_3$ of all the inverters 10a, 10b, 10c, when made available on line 52 by the inverters 10a, 10b, 10c themselves upon request of the control system 50 (method step 208).

The processing means 2 determine that the inverters 10a, 10b 10c are module-free (method step 209), e.g. by sniffing the data traffic on the line 52; as a consequence, all the sniffed measurements $M_1$, $M_2$, $M_3$ are compared by the processing means 2 of the module 1 with the measurements $M_4$ provided by the module 1 itself (execution of method step 202).

For instance, the processing means 2 of the module 1:
calculate a difference between the measurements $M_4$ and the measurements $M_1$, $M_2$ and $M_3$, and/or
correlate the electrical output power waveform represented by the measurements $M_4$ to the electrical output power waveforms represented by the measurements $M_1$, $M_2$ and $M_3$, and/or
statistically calculate an error, e.g. an average quadratic error, between the measurements $M_4$ and the measurements $M_1$, $M_2$ and $M_3$.

The processing means 2 of the module 1 compare the results of the comparisons between measurements $M_4$ and the sniffed measurements $M_1$, $M_2$ and $M_3$ with corresponding predetermined thresholds.

Figure 4:
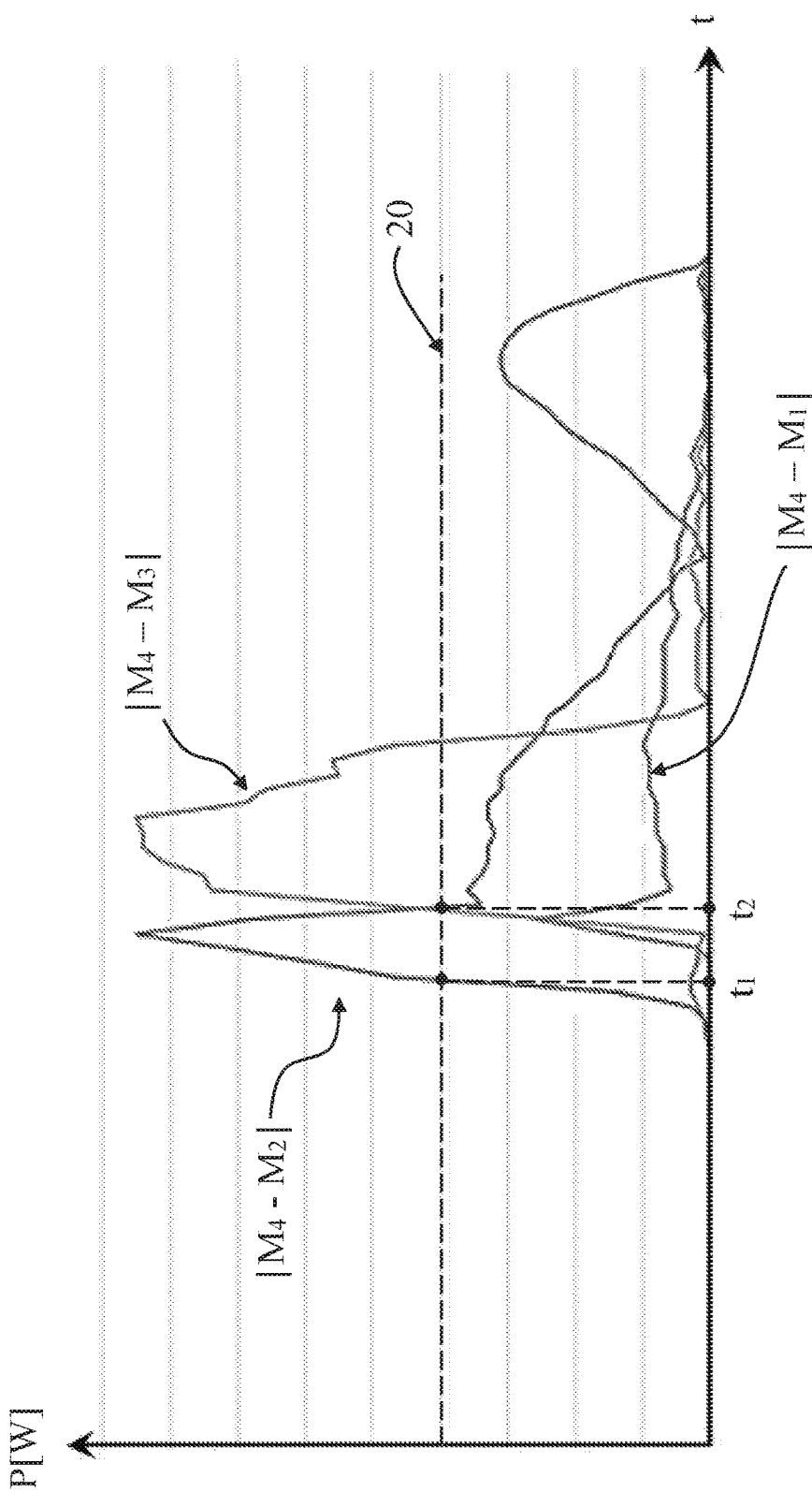
FIG. 4 illustrates a plot of the differences between the power measurements of the three inverters and the power measurement of the module illustrated in FIG. 3.

For instance, with reference to FIG. 4, the absolute values $|M_4-M_1|$, $|M_4-M_2|$, $|M_4-M_3|$ of the differences between the measurements $M_4$ and the sniffed measurements $M_1$, $M_2$ and $M_3$ are compared by the processing means 2 to the exemplary illustrated threshold 20.

Due to different operational behaviors of the inverters 10a, 10b, 10c, the absolute difference $|M_4-M_2|$ is such that to exceed the predetermined threshold 20 at a time $t_1$, while the absolute difference $|M_4-M_3|$ is such that to exceed the predetermined threshold 20 at a time $t_2$. As a result, the candidate inverters 10b and 10c are withdrawn in view of an association with the module 1 at times $t_1$ and $t_2$, respectively.

Since the measurements $M_4$ and $M_1$ are instead related to the electrical power outputted by the same inverter 10a, the absolute values $|M_4-M_1|$ of their difference remains below the threshold 20. Hence, the candidate inverter 10a is automatically recognized by the processing means 2 of the module 1 as being the effective inverter 10a corresponding to the module 1 itself (method step 203).

After such a determination, the processing means 2 of the module 1 generate the information 5 about the association between the module 1 itself and the determined corresponding inverter 10a, and send this information 5, through the communication line 52, to the control system 50 (method step 204).

At or upon the receiving of the information 5 by the control system 50, the module 1 starts to send its measurements $M_4$ to the control system 50.

For example, the processing means 2 of the module 1 tag the measurements $M_4$ with the address of the determined corresponding inverter 10a. In this way, the control system 50, who already knows the addresses of the installed inverters 10a, 10b, 10c, can easily recognize the automatically occurred association between the module 1 and corresponding inverter 10a.

Further, in order to establish a communication between the module 1 and the control system 50, an unused address is automatically assigned to the module 1 after the determination of the corresponding inverter 10a (method step 205).

The processing means 2 themselves can be able to select an unused address from a list or they can ask an unused address to the control system 50. The unused address can be randomly chooses between the addresses of the list or, preferably, it can be selected among the unused addresses having the same numerical base of the address of the determined corresponding inverter 10a.

After receiving the information 5, the control system 50 swaps the use of the measurements $M_1$ from the inverter 10a to the use of the measurements $M_4$ from the corresponding module 1, having a higher quality.

A subsequent situation is considered, where a further module 1 (depicted by dot-lines in FIG. 1) is installed in the plant 50 so as to generate measurements related to the operation of the inverter 10b. Upon the installation of the further module 1, its processing means 2 are operatively connected to the communication line 52, in such a way to sniff the measurements $M_1$, $M_2$, $M_3$ of the inverters 10a, 10b, 10c.

The processing means 2 of the further module 1 determine that the inverters 10b and 10c are module-free, while the inverter 10a has previously been associated to one module 1. For example, the processing means 2 make this determination by sniffing the measurements $M_4$ on the line 52, which are tagged with the address of the corresponding inverter 10a.

Because of such determination, only the sniffed measurements $M_2$, $M_3$ of the candidate inverters 10b, 10c are compared by the processing means 2 of the further module 1 with the measurements provided by the further module 1 itself.

Based on such comparison, which can occur similarly as the above disclosed comparison between measurements $M_4$ and measurements $M_1$, $M_2$, $M_3$, the candidate inverter 10b is automatically recognized by the processing means 2 of the further module 1 as being the effective inverter 10b corresponding to the further module 1 itself.

After such a determination, the processing means 2 of the further module 1 generate information 5 about the association between the further module 1 itself and the determined corresponding inverter 10b, and send this information to control system 50.

At or upon the receiving of this information by the control system 50, the further module 1 starts to send its measurements to the control system 50, and an unused address is automatically assigned to it.

After receiving the information 5, the control system 50 swaps the use of the measurements $M_2$ from the inverter 10b to the use of the measurements from the corresponding further module 1, having a higher quality.

In practice, it has been seen how the method 200 and related module 1 and power generation system 100 allow achieving the intended object offering some improvements over known solutions.

In particular, when installing a new module 1 in the power generation system 100, the installer has not to manually take note of the association between such new module 1 and the corresponding inverter 10a, neither the installer has to provide this information to the control system 50.

Indeed, the execution of the method 200 by the processing means 2 allows to automatically associating the module 1 to the corresponding inverter 10a, without any further operations required to the installer apart from the installation of the new module 1 in the power generation system 100.

Further, the above disclosed processing means 2 can automatically generate information of the occurred association to the control systems 50, as well as automatically assign an unused address to the new module 1, upon determination of the corresponding inverter 10a.

In this way, the process, especially in view of a replacement of the measurements $M_1$, $M_2$, $M_3$ of the inverters 10a, 10b, 10c with the measurements of corresponding modules 1, is automated and less subjected to errors.

The method 200 thus conceived, and related module 1 and power generation system 100, are also susceptible of modifications and variations, all of which are within the scope of the inventive concept as defined in particular by the appended claims.

For example, the processing means adapted to execute the above disclosed method steps can be others than the processing means 2 of the modules 1, such as suitable processing means of the inverters 10 and/or suitable processing means of the control system 50.

For example, even if preferably the measurements $M_1$, $M_2$, $M_3$, $M_4$ comprise measurements related to at least one electrical outputted parameter of the corresponding inverter 10a, 10b, 10c, these measurements $M_1$, $M_2$, $M_3$, $M_4$ can comprise in alternative or in addition temperature measurements or other measurements related to the operations of the inverters 10a, 10b, 10c.

For example, even if preferably the measurements of the modules 1 are of higher accuracy than the measurements $M_1$, $M_2$, $M_3$ of the corresponding inverters 10a, 10b, 10c, the control system 50 can integrate these measurements $M_1$, $M_2$, $M_3$ with the measurements of the associated modules 1 instead of replacing them.

For example, the term "processing means" can comprise microprocessors, digital signal processors, micro-computers, mini-computers, optical computers, complex instruction set computers, application specific integrated circuits, a reduced instruction set computers, analog computers, digital computers, solid-state computers, single-board computers, or a combination of any of these.

In practice, all parts/components can be replaced with other technically equivalent elements; in practice, the type of materials, and the dimensions, can be any according to needs and to the state of the art.

The invention claimed is:

1. A method for automatically associating a module to a corresponding inverter of a plurality of inverters which are adapted to generate measurements related to their operation, the method comprises:
   a) installing the module for generating measurements related to the operation of a corresponding inverter of said plurality of inverters, said module being adapted to sniff the measurements generated by said plurality of inverters and flowing to a control system;
   b) comparing, by processing means of said module, the measurements generated by the module to the measurements generated by the plurality of inverters and sniffed by said processing means; and
   c) basing on the comparison, determining by the processing means which of the plurality of inverters is said corresponding inverter to the module.

2. The method according to claim 1, further comprising providing, by the processing means, information about the association between the module and the determined corresponding inverter to the control system.

3. The method according to claim 1, wherein it comprises tagging the measurements of the module with the address of the determined corresponding inverter.

4. The method according to claim 1, wherein it comprises automatically assigning an unused address to the module after the execution of said step c).

5. The method according to claim 1, wherein said step b) comprises at least one of the following operations:
   calculating a difference between the measurements generated by the module and the measurements generated by the plurality of inverters;
   correlating an electrical waveform represented by the measurements generated by the module to electrical waveforms represented by the measurements generated by the plurality of inverters; and
   statistically calculating an error between the measurements generated by the module and the measurements generated by the plurality of inverters.

6. The method according to claim 1, wherein said step c) comprises comparing the results of step b) with at least one predetermined threshold.

7. The method according to claim 1, comprising:
   transmitting said measurements generated by the plurality of inverters to the control system.

8. The method according to claim 1, wherein it further comprises:
   swapping a use of the measurements generated by said corresponding inverter to a use of the measurements generated by said module after the determination at said step c).

9. A module comprising a microprocessor and configured to perform the following operations with the microprocessor:
   generate measurements related to the operation of a first inverter of a plurality of inverters;
   sniff measurements related to operations of the plurality of inverters generable by the plurality of inverters;
   compare the measurements of the module with the sniffed measurements; and
   based on the comparison, determine which of the plurality of inverters is said first inverter.

10. The module according to claim 9, wherein said module is configured to send information about the association between the module and the determined first inverter to a control system.

11. The module according to claim 9, wherein said module is configured to tag the measurements of the module with the address of the determined first inverter.

12. The module according to claim 9, wherein said module is configured to automatically assign an unused address to the module, after the determination of said first inverter.

13. The module according to claim 9, wherein said module is configured to perform at least one of the following operations:

calculate a difference between the measurements generable by the module and the measurements generable by the plurality of inverters;

compare an electrical waveform represented by the measurements generable by the module to electrical waveforms represented by the measurements generable by the plurality of inverters; and statistically calculate an error between said measurements generable by the module and said measurements generable by the plurality of inverters.

14. The module according to claim 9, wherein said module is configured to compare the results of the comparison between said measurements of the module and said measurements of the plurality of inverters with at least one predetermined threshold.

15. A power generation system comprising at least:

a plurality of inverters which are adapted to generate measurements related to their operations;

at least one module comprising a microprocessor and configured to perform the following operations with the microprocessor:

generate measurements related to the operation of a first inverter of the plurality of inverters;

sniff the measurements generated by said plurality of inverters and flowing to a control system;

compare said measurements generable by the module to said measurements generable by the plurality of inverters and sniffed by the module;

based on the comparison, determine which of the plurality of inverters is said first inverter.

16. The power generation system according to claim 15, wherein said at least one module is configured to compare the results of the comparison between said measurements of the at least one module and said measurements of the plurality of inverters with at least one predetermined threshold.

17. The power generation system according to claim 15, comprising the control system operatively associated to said plurality of inverters and to said at least one module, and wherein said plurality of inverters and said at least one module are adapted to transmit said measurements to the control system.

18. The power generation system according to claim 15, wherein said control system, after acknowledging an occurred automatic association between the module and the first inverter, is adapted to swap an use of the measurements from said first inverter to an use of the measurements from said module.

* * * * *